US005700537A

United States Patent [19]

Instance

[11] Patent Number: 5,700,537

[45] Date of Patent: Dec. 23, 1997

[54] LABELS AND MANUFACTURE THEREOF

[76] Inventor: David John Instance, Guinea Hall, Sellindge, Kent TN25 6EG, United Kingdom

[21] Appl. No.: 425,454

[22] Filed: Apr. 20, 1995

Related U.S. Application Data

[63] Continuation of Ser. No. 982,731, Feb. 26, 1993, abandoned.

[30] Foreign Application Priority Data

Aug. 31, 1990 [GB] United Kingdom .................... 9019030

[51] Int. Cl.$^6$ ................................ B32B 31/00; G09F 3/02

[52] U.S. Cl. .............................. 428/41.9; 40/299; 40/306; 40/310; 156/253; 156/270; 156/290; 156/291; 156/299; 156/300; 156/301; 156/303; 283/81; 283/101; 428/40.1; 428/41.7; 428/41.8; 428/42.2; 428/42.3; 428/43; 428/212

[58] Field of Search ................................ 428/40, 77, 354, 428/355, 352, 43, 124, 126, 130, 194, 212; 283/81, 101; 40/299, 306, 310; 156/277, 253, 270, 268, 301, 302, 305, 267, 269, 290, 291, 300, 299, 303

[56] References Cited

U.S. PATENT DOCUMENTS

| | | | |
|---|---|---|---|
| 4,534,582 | 8/1985 | Howard | 283/81 |
| 4,592,572 | 6/1986 | Instance | 283/81 |
| 4,711,686 | 12/1987 | Instance | 281/2 |
| 4,744,161 | 5/1988 | Instance | 283/81 |
| 4,930,812 | 6/1990 | Howard | 283/81 |
| 5,264,265 | 11/1993 | Kaufmann | 428/40.1 |
| 5,284,363 | 2/1994 | Gartner | 283/81 |

FOREIGN PATENT DOCUMENTS

| | | |
|---|---|---|
| 0087987 | 9/1983 | European Pat. Off. . |
| 0130053 | 1/1985 | European Pat. Off. . |
| 0252608 | 1/1988 | European Pat. Off. . |
| 0283064 | 9/1988 | European Pat. Off. . |
| 0346567 | 12/1989 | European Pat. Off. . |
| 2127378 | 4/1984 | United Kingdom . |
| 2141994 | 1/1985 | United Kingdom . |
| 2154539 | 9/1985 | United Kingdom . |
| 2191463 | 12/1987 | United Kingdom . |
| 2192605 | 1/1988 | United Kingdom . |
| 2207411 | 2/1989 | United Kingdom . |
| 2212474 | 7/1989 | United Kingdom . |

OTHER PUBLICATIONS

"Examiner's report to the Comptroller under Section 17 (The Search Report)" dated 18 Oct. 1990 (search report issued on UK Appln. 9019030.7).

"International Search Report" dated Nov. 25, 1991 (EPO search report issued on International Appln. PCT/GB 91/01472).

First "Written Opinion" dated May 29, 1992 issued on PCT/GB91/01472.

*Primary Examiner*—Nasser Ahmad

*Attorney, Agent, or Firm*—Rothwell, Figg, Ernst & Kurz, P.C.

[57] ABSTRACT

The present invention relates to a self-adhesive label comprising a multi-laminar folded label which comprises first and second portions which are adhered to a backing of release material or to a self-adhesive support piece carried on a backing of release material by a first region of resealable adhesive respectively; and a method of producing a succession of self-adhesive labels carried on a backing of release material, the method comprising the steps of applying to a backing of release material or to a self-adhesive support piece carried on a backing of release material a succession of first regions of permanent adhesive and a succession of second regions of resealable adhesive and disposing a succession of multi-laminar folded labels to the adhesive regions whereby each multi-laminar folded label is adhered to the backing of release material or to the self-adhesive support piece by one of the first regions of adhesive and one of the second regions of adhesive.

11 Claims, 2 Drawing Sheets

LABELS AND MANUFACTURE THEREOF

This is a continuation of application Ser. No. 07/982,731, filed Feb. 26, 1993, now abandoned.

BACKGROUND OF THE INVENTION

Summary of the Invention

The present invention relates to a self-adhesive label and to a method of producing a succession of self-adhesive labels carried on a backing of release material.

It is known to provide resealable multilaminar labels which, after they have been adhered to a product, can be opened to reveal previously hidden surfaces.

The present invention aims to provide an improved such label and an improved method of manufacturing such labels.

Accordingly, the present invention provides a self-adhesive label comprising a multilaminar folded label which comprises first and second portions which are adhered to a backing of release material or to a self-adhesive support piece carried on a backing of release material by a first region of permanent adhesive and a second region of resealable adhesive respectively.

The present invention also provides a method of producing a succession of self-adhesive labels carried on a backing of release material, the method comprising the steps of:

(a) applying to a backing of release material or to a self-adhesive support piece carried on a backing of release material a succession of first regions of permanent adhesive and a succession of second regions of resealable adhesive; and (b) disposing a succession of multilaminar folded labels to the adhesive regions whereby each multilaminar folded label is adhered to the backing of release material or to the self-adhesive support piece by one of the first regions of adhesive and by one of the second regions of adhesive.

The present invention further provides a self-adhesive label comprising a multilaminar folded booklet having a front cover, a rear cover and at least one sheet between the front and rear covers, the front cover and the rear cover being adhered to a backing of release material by respective first and second spaced regions of adhesive, and a weakened tear line which is located between the front and rear covers whereby the front cover and the at least one sheet are removable from the rear cover by tearing along the weakened tear line.

The present invention still further provides a method of producing a succession of self adhesive labels carried on a web comprising a backing of release material, the method comprising the steps of:

(a) applying to a backing of release material a succession of first and second regions of adhesive;

(b) disposing a succession of multilaminar folded labels to the adhesive regions whereby each multilaminar folded label is adhered to the backing of release material by a pair of the first and second regions of adhesive.

BRIEF DESCRIPTION OF THE DRAWINGS

Embodiments of the present invention will now be described by way of example only with reference to the accompanying drawings, in which.

DESCRIPTION OF THE PREFERRED EMBODIMENTS

Figure 1:
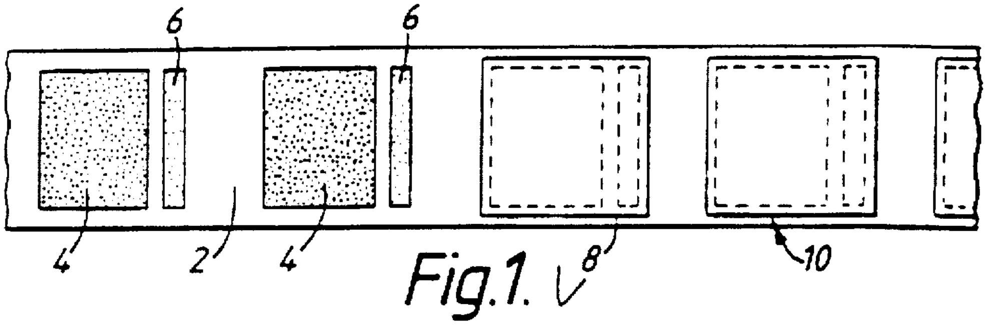
FIG. 1 is a plan view of a length of a backing of release material carrying adhesive regions and self-adhesive labels in accordance with a first embodiment of the present invention.

Referring to FIG. 1, there is shown a length of a backing 2 of release material which has had applied thereto a succession of first regions 4 of permanent adhesive and a succession of second regions 6 of resealable adhesive. Typically, the permanent and resealable adhesives are hot melt adhesives. Each second region 6 of resealable adhesive is disposed longitunally substantially adjacent a respective first region 4 of permanent adhesive whereby the first and second regions 4,6 are oriented in pairs of those regions 4,6. The regions 4,6 of adhesive are printed or otherwise applied directly to the backing 2 of release material and the regions 4,6 are applied either simultaneously or successively in any order. In the manufacture of the self-adhesive labels in accordance with the first embodiment of the present invention, the backing 2 of release material carrying the successions of pairs of regions, 4,6 is passed to a label applying station (not shown) at which multilaminar folded labels 8 are successively applied to the adhesive regions 4,6 whereby each applied label 8 covers a respective pair of regions 4,6. The labels 8 are dimensioned so as entirely to cover the respective pair of adhesive regions 4,6 so that no free adhesive is exposed. The backing 2 of release material carrying the adhered labels 8 forming the resultant self-adhesive labels 10 thereon is then wound into a reel.

Figure 2:
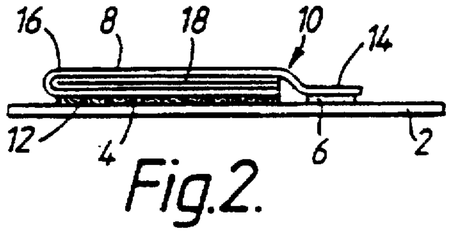
FIG. 2 is an elevational view of the self-adhesive label shown in FIG. 1.

A self-adhesive label 10 in accordance with the first embodiment is shown in greater detail in FIG. 2. It will be seen that the multilaminar folded label 8 comprises a first portion 12 which is adhered to the first region 4 of adhesive and a second portion 14 which is adhered to the second region 6 of adhesive. The first portion 12 comprises a rear panel of the multilaminar folded label 8 and the second portion 14 comprises an overlapping flap of a front panel 16 of the folded label. In the illustrated embodiment additional panels 18 are disposed between the rear 12 and front 16 panels.

In use, the self-adhesive label 10 is removed from the backing 2 of release material and then the self-adhesive label 10 is adhered to a product to be labelled by the first and second regions 4,6 of adhesive. When it is desired to open the multilaminar folded label 8, a user pulls the overlapping flap 14 away from the product thereby to release the flap 14 from the product at the interface with the resealable adhesive region 6. The main body of the self-adhesive label 10 remains permanently adhered to the product by means of the first region 4 of permanent adhesive. After the additional panels 18 have been read by a user, the overlapping flap 14 can be re-adhered to the product by means of the second region 6 of resealable adhesive.

Figure 3:
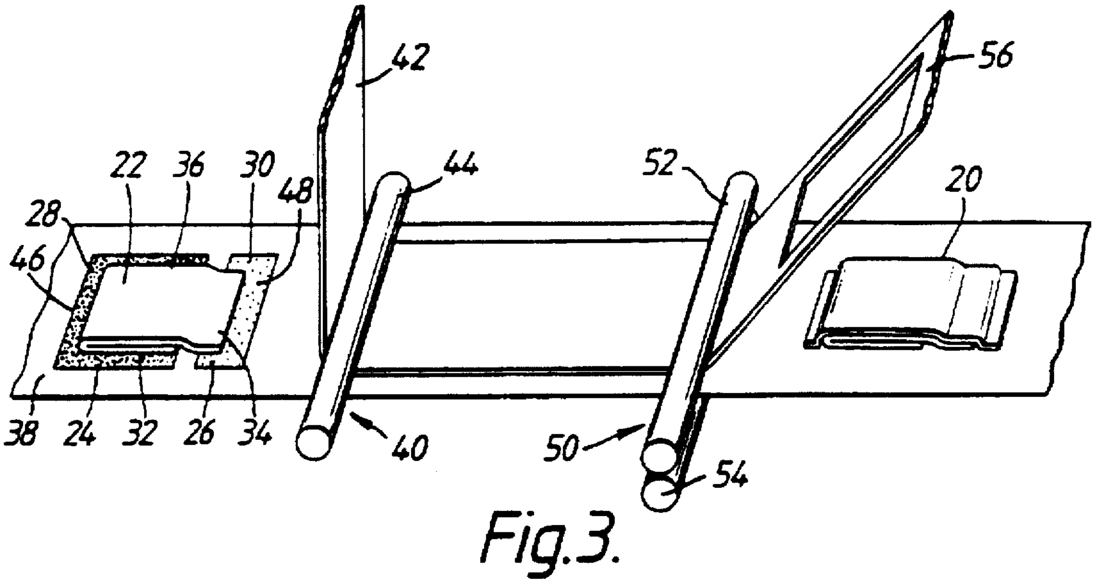
FIG. 3 is a schematic perspective view of an apparatus for use in a method of producing labels in accordance with a second embodiment of the present invention.
Figure 4:
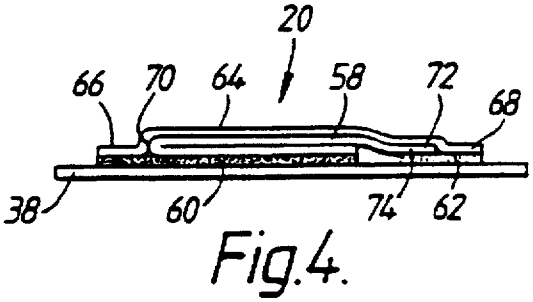
FIG. 4 is an elevational view of the self-adhesive label made by the method shown in FIG. 3.

A second embodiment of the present invention is shown in FIGS. 3 and 4. Referring to FIG. 3, in the manufacture of the self-adhesive labels 20 of the second embodiment, a succession of multilaminar folded labels 22 is applied to a succession of pairs of first regions 24 of permanent adhesive and second regions 26 of resealable adhesive in the manner described hereinabove with reference to FIGS. 1 and 2. In this embodiment however, the applied multilaminar folded labels 22 are smaller in dimensional area than the regions defined by the first and second regions 24,26 of adhesive whereby respective parts 28,30 of the first and second regions 24,26 are left exposed and those parts 28,30 surround the applied multilaminar folded label 22. As in the first embodiment, a first portion 32, comprising a rear panel, of the folded label 22 is adhered to the first region 24 and a second portion 34, comprising an overlapping flap of a front panel 36 of the folded label 22, is adhered to the second region 26 of adhesive. Each region 24,26 of adhesive extends beyond the longitudinally directed edges of the applied label 22. The regions 24,26 of adhesive adhere the label 22 to a backing 38 of release material.

The label 22 adhered to the backing 38 of release material is passed to a laminar material applying station 40 at which a laminar material 42, which comprises a transparent plastics web e.g. of polyester, is urged by a roller 44 over the succession of applied labels 22 and of regions 24,26 of adhesive. The rearwardly-directed surface of the laminar material 42 is adhered to the exposed parts 46,48 of the first and second portions 24,26. The combined assembly then passes to a die-cutting station 50 at which the assembly is passed between an upper die-cutting roller 52 and a lower backing roller 54. The die-cutting roller 52 is adapted to cut out from the laminar material 42 and the multilaminar folded label 22, a self-adhesive label 20 which remains on the backing 38 of release material. The waste web remnant 56 is removed. In the die-cutting step two transversely oriented cuts are made through the laminar material 42, one cut being upstream and the other cut being downstream of the respective multilaminar folded label 22. In the die-cutting step additionally two longitudinal cuts are made through the laminar material 42 and through the applied multilaminar folded label 22. The waste web remnant 56 comprises the excess laminar material 42 and in addition the cut-away longitudinal edges of the multilaminar folded label 22 and the extraneous adhesive from the regions 24,26.

The resultant self-adhesive label is shown in FIG. 4 from which it will be seen that the folded label portion 58 which has been cut from the original multilaminar folded label 22 is adhered by respective areas 60,62 of the original first and second regions 24,26 of adhesive to the backing 38 of release material. A laminar material portion 64 covers the folded label portion 58 and has first and second opposed edge regions 66,68 thereof which extend past respective edges 70,72 of the label portion 58. The first and second edge regions 66,68 are respectively adhered to the backing 38 of release material by the first and second areas 60,62 of the adhesive regions 24,26. Thus the laminar material portion 64 is retained in a closed configuration by the adhesion of the opposed edge regions 66,68 to the backing 38 of release material. The laminar material portion 64 covers the entire self-adhesive label 20 and protects the label 20 from damage or soiling. An overlapping flap 74 of the front cover panel is adhered to the area 62 of resealable adhesive. The label of FIG. 4 may be modified by shortening the front cover panel thereby removing the overlapping flap whereby the folded label portion is itself only adhered to the adhesive area 60 and it is only the laminar material portion 64 which is adhered to the area 62 of resealable adhesive.

In use, when it is desired to label a product the self-adhesive label 20 is stripped off from the backing 38 of release material e.g. by an automatic labelling machine and the label 20 is adhered to the product by the areas 60,62 of adhesive. When it is desired to open the label 20 so as to access the hidden inner surfaces, the edge region 68 of the laminar material portion 64 and the overlapping flap 74 are pulled away from the product at the interface with the areas 62 of resealable adhesive. After the label has been read by a user, the overlapping flap 74 and the edge portion 68 of the laminar material portion 64 can be readhered to the product by the area 62 of resealable adhesive.

Figure 5:
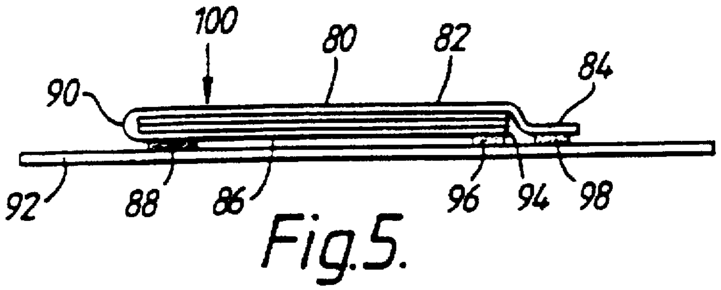
FIG. 5 is an elevational view of a self-adhesive label in accordance with a third embodiment of the present invention.

A third embodiment of then self-adhesive label in accordance with the present invention is illustrated in FIG. 5. In this embodiment, a folded label portion 80 is in the form of a booklet having a front cover panel 82 which is longer than the remaining panels so as to define an overlapping flap 84. A back cover panel 86 of the booklet is adhered by a strip 88 of a permanent adhesive which extends adjacent the spine 90 of the booklet to a backing 92 of release material. The free edge 94 of the back cover panel 86 is releasably adhered to the backing 92 of release material by a strip 96 of resealable adhesive which is parallel to the strip 88 of permanent adhesive. The overlapping flap 84 of the front cover panel 82 is adhered to the backing 92 of release material by a second strip 98 of resealable adhesive which is parallel to and spaced from the strip 96. In use, the label 100 is removed from the backing 92 of release material and adhered to a product to be labelled by the three strips 88, 96 and 98 of adhesive. When it is desired to open the label, a user pulls the overlapping flap away from the product and this strips away the overlapping flap 84 from the strip 98 of resealable adhesive to permit the label to be opened and the inner pages of the booklet to be read. In addition, the rear surface of the back cover panel 86 may be printed with information and in order to access this information the user can pull the edge 94 of the back cover panel 86 away from the strip 96 of resealable adhesive. The edge 94 and the overlapping flap 84 may be readhered if desired to the respective strips 96, 98 of resealable adhesive.

The label 100 may be manufactured by a method substantially the same as that employed to manufacture the label of the first embodiment illustrated in FIGS. 1 and 2.

Figure 6:
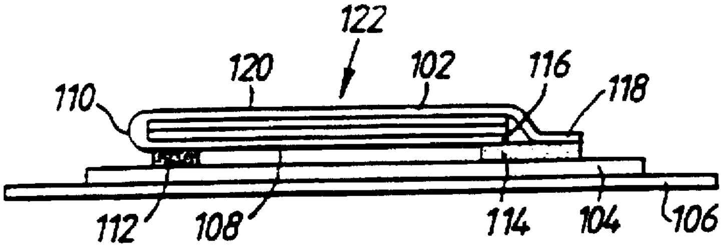
FIG. 6 is an elevational view of a self-adhesive label in accordance with a fourth embodiment of the present invention.

A fourth embodiment of a label in accordance with the present invention is illustrated in FIG. 6. In this embodiment, a folded label portion 102 in the form of a booklet has a similar construction to that illustrated in FIG. 5. This embodiment is modified in that the folded label portion 102 is not adhered directly to a backing of release material bug rather the folded label portion 102 is adhered to a support piece 104, typically of paper, which is self-adhesive, being coated on its rear surface with a pressure-sensitive adhesive, and is itself carried on a backing 106 of release material. The booklet 102 has a back cover panel 108 which is adhered adjacent the spine 110 of the booklet to the support piece 104 by a strip 112 of permanent adhesive. A strip 114 of resealable adhesive adheres to the support piece 104 both the free edge 116 of the back cover panel 108 and the overlapping flap 118 of the front cover panel 120. When it is desired to label a product, the support piece 104 is stripped off from the backing 106 of release material and adhered by its self-adhesive surface to the product to be labelled. The label 122 can be opened and closed as desired in the manner described hereinabove with reference to the embodiment of FIG. 5.

The label of FIG. 6 is manufactured in a manner similar to the method of manufacture of the second embodiment illustrated in FIGS. 3 and 4 except that a laminating procedure is not employed. Strips 112, 114 of adhesive are applied to a self-adhesive support web which is carried on the backing 106 of release material, the self-adhesive support web subsequently being die-cut to form the support pieces 104. After the strips 112, 114 of adhesive have been applied, a succession of folded label portions 102 are applied thereto and then the composite assembly passes to a die-cutting station at which the support web is cut to form the support pieces 104 and also the ultimate self-adhesive labels 122. If desired, in the die-cutting step the applied folded label portions may also be cut either along their longitudinal edges or along thee transvers edge which is remote from the spine 110 (the longitudinal and transverse directions being equivalent to those illustrated in FIG. 3) and the waste portions of the cut away parts of the applied folded label portions 102 are removed together with the waste web remnant of the support web. This can provide coincident edges of the applied folded label 102 and the support piece 104.

The first, second and third embodiments may be modified by adhering the applied folded label to a self-adhesive support piece carried on a backing of release material rather than to the backing of release material directly. It will be readily apparent to the man skilled in the art how this may be achieved.

Figure 7:
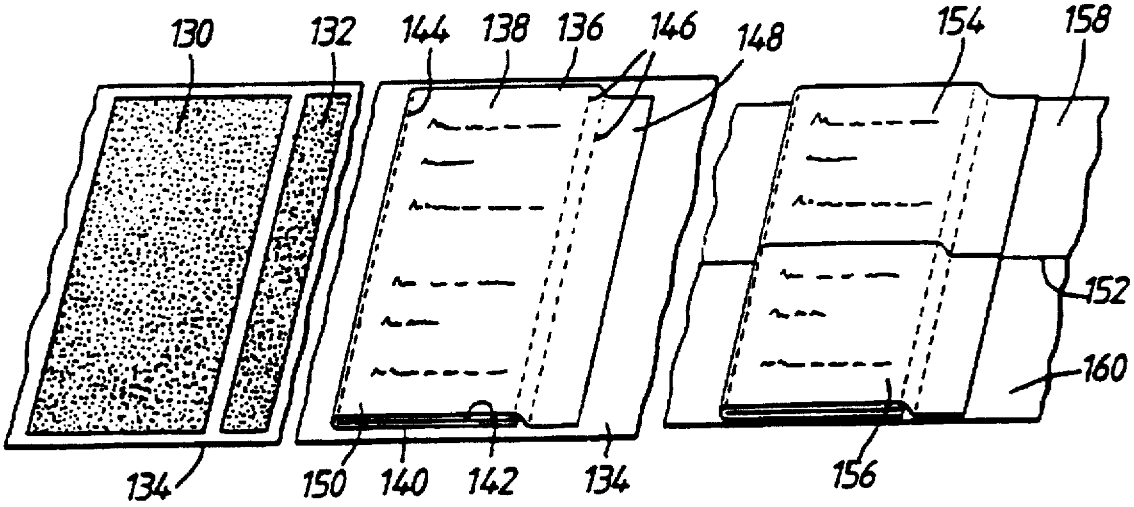
FIG. 7 is a schematic perspective view of the production of labels in accordance with a fifth embodiment of the present invention.

A fifth embodiment of the present invention is illustrated in FIG. 7. A succession of first regions 130 and second regions 132 of adhesive are applied to a web of a backing of release material 134. In this embodiment, the adhesive of the first and second regions 130, 132 may be the same type of adhesive, typically permanent hot melt adhesive. The disposition of the regions of adhesive is substantially the same as that in the first embodiment illustrated in FIG. 1. Subsequently, at a label applying station a multilaminar booklet 136 is applied over and adhered to the first and second regions of adhesive 130, 132 so as to completely to cover those regions. The booklet 136 includes a front cover 138 and rear cover 140 and at least one sheet 142 disposed therebetween. The first weakened tear line 144 comprising a line of perforations which extends between the front and rear covers 138, 140 whereby if the weakened tear line 144 is torn the front cover 138 and the at least one sheet 142 can be detached from the rear cover 140. Thus, when the rear cover 140 is adhered to a product to be labelled by the region 130 of adhesive, the body of the folded booklet can be detached from the rear cover 140 leaving the rear cover 140 attached to the product. A pair of second weakened tear lines 146 are constituted by perforation lines which extend across the front cover 138 so as to separate the front cover 138 into an end portion 148 which is adhered to the backing 134 of release material by the second region 132 of adhesive and a body portion 150 which is disposed above the at least one sheet 142 and the rear cover 140. Tearing along the second weakened tear lines 146 permits the folded booklet 136 to be opened when the folded booklet 136 is adhered to a product to be laballed so as to enable the at least one sheet 142 and the rear cover 140 to be accessed.

It is possible for the booklet 136 to comprise the entire self-adhesive label. However, in the illustrated embodiment the booklet 136 actually constitutes two separate labels. The two separate labels are formed by longitudinally slitting along a slitting line 152. The slitting line 152 extends coextensively through the booklet 136 so as to divide the booklet 136 into booklet portions 154, 156 and through the backing 134 of release material so as to divide the backing 134 into backing portions 158, 160. The waste at the longitudinal edges of the composite booklet/backing assembly, the waste consisting of cut-away portions of both the backing 134 and the applied booklet 136, is removed. Thus, in the illustrated embodiment a pair of webs is formed, each comprising a succession of booklet portions being carried on a backing of release material. The booklet portions 154, 156 may be removed from the respective web 158, 160 and adhered to a product to be labelled by the respective portions of the first and second regions 130, 132 of adhesive. When it is desired to open each label, the front cover portion is torn along the second weakened tear lines 146 so as to enable the label to be opened. Subsequently, the front cover portion and the at least one sheet portion may be torn away from the rear cover portion by tearing along the first tear line 144.

I claim:

1. A self-adhesive label comprising a multilaminar folded label which comprises first and second portions which are adhered to a backing of release material by a first region of permanent adhesive and a second region of resealable adhesive respectively, the first portion comprising a rear panel of the folded label and the second portion comprising an overlapping flap of a front panel of the folded label, there being a first, folded edge between the front and rear panels, said self-adhesive label further comprising a laminar material which covers the folded label and has a first edge region thereof which extends past the folded edge and is adhered to the backing of release material.

2. A self-adhesive label according to claim 1 wherein said laminar material further has a second edge region opposite to the first edge region and extending past a second edge of the folded label and adhered to the backing of release material.

3. A self-adhesive label according to claim 1 wherein the first region comprises a strip of permanent adhesive which is adhered adjacent to said folded edge of the folded label and the second region is adhered to a free edge of the rear panel which is remote from the folded edge.

4. A self-adhesive label according to claim 3 wherein the second region comprises two strips of resealable adhesive, one of which is adhered to the free edge and the other of which is adhered to the overlapping flap.

5. A method of producing a succession of self-adhesive labels carried on a backing of release material, the method comprising the steps of;

(a) applying to a backing of release material a succession of first regions of permanent adhesive and a succession of second regions of resealable adhesive; and (b) disposing a succession of multilaminar folded labels to the adhesive regions whereby each multilaminar folded label is adhered to the backing of release material by one of the first regions of adhesive and one of the second regions of adhesive, the succession of multilaminar folded labels being disposed such that parts of the first and second regions are left exposed, said method further comprising the steps of:

(c) applying a laminar material over the succession of multilaminar folded labels whereby the laminar material is adhered to the exposed parts of the first and second regions; and (d) cutting through the laminar material and through the applied multilaminar labels to form the self-adhesive labels, the cutting being performed whereby each self-adhesive label includes a portion of the laminar material which is adhered at opposed first and second edge regions thereof to the first and second regions of adhesive respectively.

6. A method of producing a succession of self-adhesive labels carried on a backing of release material, the method comprising the steps of:

(a) applying to a backing of release material a succession of first regions of permanent adhesive and a succession of second regions of resealable adhesive, the first and second regions being oriented in pairs of those regions and being substantially adjacent to each other; and (b) disposing a succession of multilaminar folded labels to the adhesive regions whereby each multilaminar folded label is adhered to the backing of release material by one of the first regions of adhesive and one of the second regions of adhesive, the succession of multilaminar folded labels being disposed such that parts of the first and second regions are left exposed, said method further comprising the steps of:

(c) applying a laminar material over the succession of multilaminar folded labels whereby the laminar material is adhered to the exposed parts of the first and second regions; and (d) cutting through the laminar material and through the applied multilaminar labels to form the self-adhesive labels, the cutting being performed whereby each self-adhesive label includes a portion of the laminar material which is adhered at opposed first and second edge regions thereof to the first and second regions of adhesive respectively.

7. A method of producing a succession of self-adhesive labels carried on a web comprising a backing of release material, the method comprising the steps of:

(a) applying to a backing of release material a succession of first and second regions of adhesive;

(b) disposing a succession of multilaminar folded labels to the adhesive regions whereby each multilaminar folded label is adhered to the backing of release material by a pair of the first and second regions of adhesive, the succession of multilaminar folded labels being disposed such that parts of the first and second regions are left exposed, said method further comprising the steps of (c) applying a laminar material over the succession of multilaminar folded labels whereby the laminar material is adhered to the exposed parts of the first and second regions; and (d) cutting through the laminar material and through the applied multilaminar labels to form the self-adhesive labels, the cutting being performed whereby each self-adhesive label includes a portion of the laminar material which is adhered at opposed first and second edge regions thereof to the first and second regions of adhesive respectively.

8. A method according to claim 7, wherein in step (d) each multilaminar label is cut into a plurality of cut labels and the backing of release material is cut into a corresponding plurality of cut webs so that each cut web of release material carries a succession of the cut labels.

9. A self-adhesive label, comprising a backing of release material with a first region of permanent adhesive adhered to the backing, and a second region of releasable adhesive adhered to the backing adjacent the first region of permanent adhesive; and a multilaminar folded label with a first portion of said folded label being adhered to said backing by said first region of said permanent adhesive and a second portion of said folded label being adhered to said backing by said second region of releasable adhesive, said first portion comprising a rear panel of the folded label and the second portion comprising an overlapping flap of a front panel of the folded label, said self-adhesive label further comprising a laminar material which covers the folded label and has a first edge region thereof which extends past the folded edge and is adhered to the backing of release material.

10. A method of producing a succession of self-adhesive labels carried on a backing of release material, the method comprising the steps of:

(a) applying to a backing of release material a succession of first regions of permanent adhesive and a succession of second regions of resealable adhesive; and (b) disposing a succession of multilaminar folded labels to the adhesive regions whereby each multilaminar folded label is adhered to the backing of release material by one of the first regions of adhesive and one of the second regions of adhesive, the succession of multilaminar folded labels being disposed so as to cover completely respective pairs of first and second regions, said method further comprising the steps of:

(c) applying a laminar material over the succession of multilaminar folded labels whereby the laminar material is adhered to the backing of release material; and (d) cutting through the laminar material and through the applied multilaminar labels to form the self-adhesive labels, the cutting being performed whereby each self-adhesive label includes a portion of the laminar material which is adhered at opposed first and second edge regions thereof to the first and second regions of adhesive respectively.

11. A method of producing a succession of self-adhesive labels carried on a backing of release material, the method comprising the steps of:

(a) applying to a backing of release material a succession of first regions of permanent adhesive and a succession of second regions of resealable adhesive, the first and second regions being oriented in pairs of those regions and being substantially adjacent to each other; and (b) disposing a succession of multilaminar folded labels to the adhesive regions whereby each multilaminar folded label is adhered to the backing of release material by one of the first regions of adhesive and one of the second regions of adhesive, the succession of multilaminar folded labels being disposed so as to cover completely respective pairs of first and second regions, said method further comprising the steps of:

(c) applying a laminar material over the succession of multilaminar folded labels whereby the laminar material is adhered to the backing of release material; and (d) cutting through the laminar material and through the applied multilaminar labels to form the self-adhesive labels, the cutting being performed whereby each self-adhesive label includes a portion of the laminar material which is adhered at opposed first and second edge regions thereof to the first and second regions of adhesive respectively.

* * * * *